United States Patent [19]
Rynkowski

[11] 3,822,946
[45] July 9, 1974

[54] DIMENSIONAL MEASURING APPARATUS USING OPTICAL SCAN ESPECIALLY FOR HARDNESS TESTING

[75] Inventor: Gerald Alexander Rynkowski, Mount Clemens, Mich.

[73] Assignee: Schiller Industries, Inc., Warren, Mich.

[22] Filed: Dec. 7, 1972

[21] Appl. No.: 313,087

[52] U.S. Cl. ............... 356/160, 356/167, 250/560, 73/81
[51] Int. Cl. ......................................... G01b 11/02
[58] Field of Search ........... 356/160, 167, 200, 237; 250/219 ND, 560; 73/81

[56] References Cited
UNITED STATES PATENTS

| | | | |
|---|---|---|---|
| 2,713,259 | 7/1955 | Grodzinski et al. | 73/81 |
| 3,176,306 | 3/1965 | Burns | 356/237 X |
| 3,222,979 | 12/1965 | Webster | 356/160 |
| 3,360,651 | 12/1967 | Linderman | 356/200 X |
| 3,384,753 | 5/1968 | Revesz | 356/160 |
| 3,427,109 | 2/1969 | Beattie et al. | 356/200 X |
| 3,574,469 | 4/1971 | Emerson | 356/200 |
| 3,592,545 | 7/1971 | Paine | 356/167 |
| 3,658,428 | 4/1972 | Voigtlaender-Tetzner | 250/219 WD |

Primary Examiner—Ronald L. Wibert
Assistant Examiner—Paul K. Godwin
Attorney, Agent, or Firm—Reising, Ethington and Perry

[57] ABSTRACT

A noncontacting dimension measuring instrument is disclosed which utilizes an optical scanner and a pulse width measuring circuit. It is adapted to measure a dimension of a surface feature of a workpiece, especially for use as an automatic readout for a hardness testing machine. The measuring instrument utilizes a video detector, a level detector and a gating circuit which gates out or excludes unwanted video pulses. In hardness testing where the video signal may be produced by multiple reflections from a single indentation, logic means are provided to exclude the effect of reflections from the bottom of the indentation. The gate signal is produced by a gate generator in response to a start of scan detector signal which is adjusted in position and width to coincide with and slightly overlap the desired video pulse. The gate output is applied to a constant amplitude pulse generator and the time average value of the constant amplitude pulses is proportional to the dimension of the surface feature being measured.

25 Claims, 8 Drawing Figures

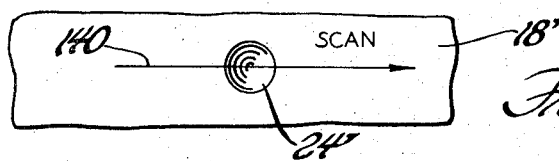
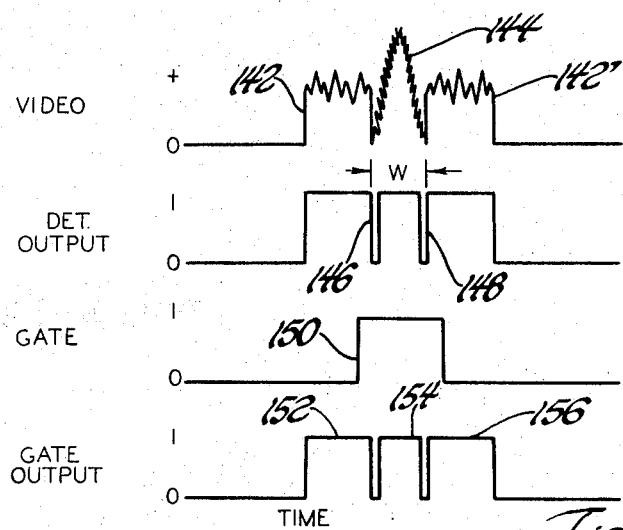
Fig. 6a
Fig. 6b
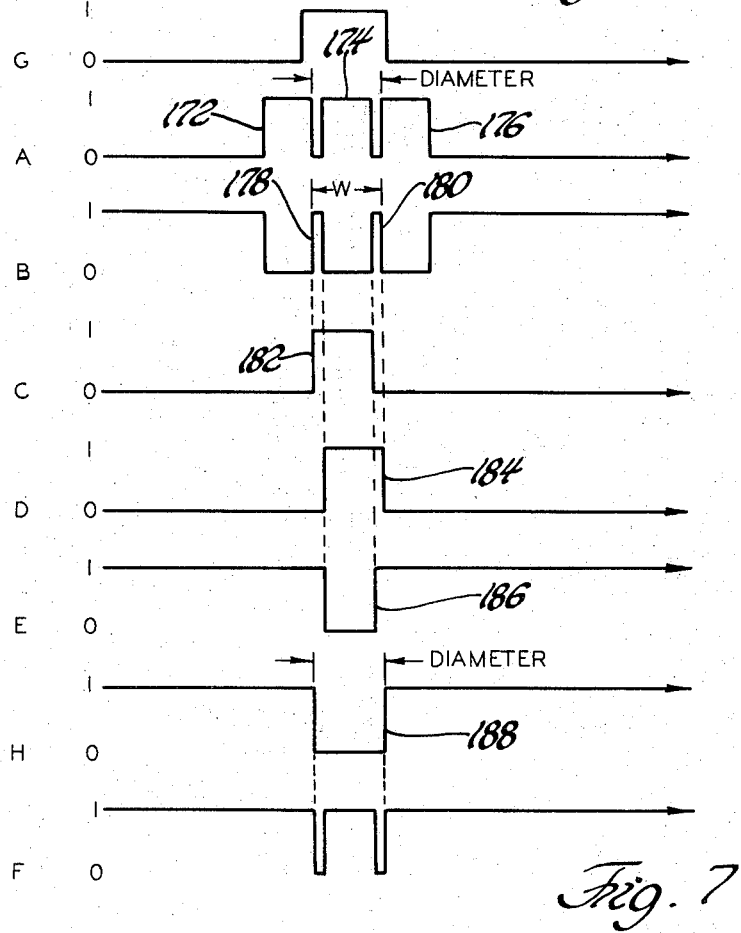
Fig. 7

DIMENSIONAL MEASURING APPARATUS USING OPTICAL SCAN ESPECIALLY FOR HARDNESS TESTING

This invention relates to a dimension measuring instrument using an optical scanning beam and more particularly it relates to such an instrument for use with hardness testing machines.

There are many applications in industry where it is desirable to perform measurements automatically on a workpiece and especially without physical contact of the measuring instrument and the workpiece. A particular example is the hardness testing of materials wherein an indenting element is applied with predetermined force to the surface of the workpiece and a dimension of the impression made thereby is taken as an index of hardness. One well known standard hardness test, known as the Brinell test, uses a spherical indenting element and the diameter of the impression at the surface plane of the workpiece is taken as an indication of hardness. Heretofore it has been the conventional practice to measure the diameter of the impression manually by use of a calibrated magnifying glass seated on the workpiece over the impression. One difficulty with this technique is that it is very time consuming and involves the subjective judgment of the person making the measurement.

According to the present invention there is provided a noncontacting dimension measuring instrument for measuring a surface feature on a workpiece automatically. This is accomplished by using an optical scanner which causes a beam to scan a predetermined path on the surface of a workpiece, photodetector means adapted to respond to that portion of the beam which is reflected from the surface at an angle within a given range and electronic means responsive to the electrical pulse from the photodetector for indicating a value proportional to the time duration of the pulse as a measurement of the length of the given surface feature along the path of scan.

Further, in accordance with the invention there is provided an automatic hardness checking apparatus for use with a hardness testing machine. This is accomplished by mounting an optical scanner on the hardness testing machine in predetermined relation with the indenting element, means for causing a beam to traverse a scanned path across the impression in the workpiece formed by the indenting element, photodetector means disposed in a position to respond to the specular reflection from the surface of the workpiece within a given range of reflectance angles, and electronic means responsive to the time duration of the electrical pulse produced by the photodetector means.

Furthermore, in accordance with the invention, there is provided an electronic measuring device which is capable of automatically executing a measurement of a selected surface feature or reflectance discontinuity on the workpiece. This is accomplished by causing the scanner means to execute at least one scan in a predetermined path on the surface of the worpiece using a photodetector means, producing an electrical measurement pulse during the traverse of the discontinuity and using the time average value of the pulse over the time period of the scanning motion as an indication of the dimension of the discontinuity along the scan path. Preferably the photodetector means responds to that portion of the beam which is reflected from the normal surface of the workpiece at an angle within a given range of reflectance angles. Additionally, means including a start of scan detector are utilized to develop a gating pulse which overlaps the measurement pulse by a very limited extent and is applied to a gate circuit to gate out or exclude unwanted pulses produced by the measurement photodetector and thereby admit only the desired measurement pulse to pulse duration circuitry. The pulse duration circuitry preferably comprises a constant amplitude pulse generator connected with the gating circuit to produce an output pulse of constant amplitude and of a duration corresponding to the measurement pulse. An averaging circuit connected with the pulse generator produces an output signal corresponding to the time average of the constant amplitude pulses over the time interval of the workpiece scanning and suitable display means are connected with the averaging circuit to indicate the measurement of the pluse duration as an indication of the dimension measurement. Preferably a level detector is interposed between the measurement photodetector and the gating circuit and is provided with automatic set level circuits which establish a threshold value for the level detector. Accordingly the level detector excludes any noise signals below the threshold level. Desirably, a level detector is included between the start of scan detector and the gate generator, thereby preventing spurious signals below a threshold level from producing a gating pulse in the gating circuit.

In certain applications of the invention the reflectance characteristics of the surface feature or discontinuity being measured are such that the intensity of the reflected beam throughout the span of the discontinuity is significantly different from the intensity of the beam reflected from the normal surface on either side of the discontinuity. For example, in measuring the diameter of a drilled hole extending through a workpiece the "hole" may be substantially nonreflective or "black." In some cases the surface of the discontinuity may be blackened to render the surface nonreflective. In either case, the normal surface of the workpiece adjacent the discontinuity may be substantially reflective and the discontinuity may be substantially nonreflective. Thus the reflected beam will have a variation in intensity level which changes in a step-function manner at the edge crossing during the scanning motion of the beam. When such a reflectance change is produced by the discontinuity, i.e., where the reflectance is substantially uniform throughout the span of the discontinuity, the invention may be practiced as described above; however, in certain applications the reflectance of the discontinuity is nonuniform and special measures must be taken to obtain measurement of the dimension from one edge to the other of the discontinuity. An example of such an application is that of hardness testing wherein the "bottom" of the discontinuity is highly reflective or is at least as reflective as the normal surface of the workpiece adjacent the discontinuity.

In accordance with the invention, electronic means are provided to ensure that the measurement obtained is the dimension between the edges of the discontinuity. This is accomplished by means for distinguishing between changes of reflectance at the edges of the discontinuity and changes of reflectance at localized points between the edges of the discontinuity. Preferably, this is implemented by the provision of digital logic circuitry which produces an output pulse having leading and trailing edges corresponding to the edges of the discontinuity. In particular, in the example of hardness testing it has been found that the bottom of the discontinuity, in certain metals at least, is highly reflective and since the tangent line is parallel to the normal surface, it tends to produce an output pulse like that of the normal surface. According to the invention, however, the logic circuitry is operative to blank out the pulse produced by the bottom of the discontinuity.

A more complete understanding of this invention may be obtained from the detailed description that follows, taken with the accompanying drawings in which:

FIG. 6a is a diagram showing the scan path on a workpiece;

FIG. 6b is a waveform diagram for a given operating condition, and

FIG. 7 is a waveform diagram pertaining to the logic circuit of FIG. 5.

Figure 1:
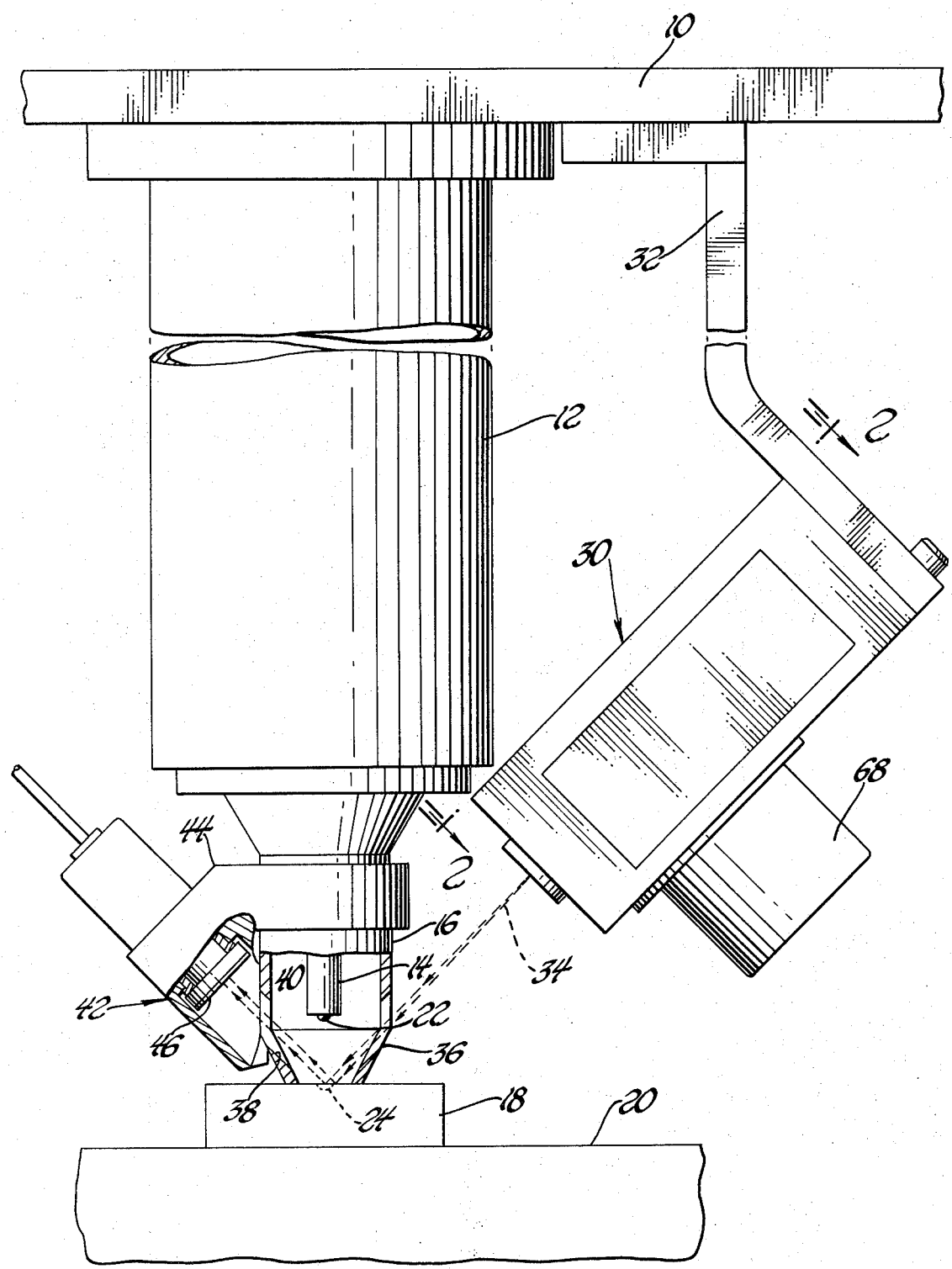
FIG. 1 is an elevation view of the inventive measuring apparatus mounted on a hardness testing machine.

Referring now to the drawings, there is shown an illustrative embodiment of the invention in a hardness testing machine for automatically measuring a dimension of an indentation or impression on the surface of a workpiece to obtain an indication of the hardness of the workpiece. In this embodiment the invention is carried out in combination with a Brinell hardness testing machine which, as is well known, is widely used for measuring the hardness of a metal. Such a machine utilizes an indentor with an indenting element in the form of a hard ball which is pressed into the specimen or workpiece under a standard load. The Brinell number indicative of hardness is derived as a function of the spherical area of the impression and as a practical matter the number is obtained by measuring the diameter of the impression in the surface plane of the workpiece and referring to standard tables to obtain the hardness number. For the usual applications of Brinell hardness testing the diameter of the impression may vary from about 2 to 5 millimeters and the standard tables of diameter versus hardness state the diameter in increments of 0.1 millimeter. In order to achieve the desired uniformity of measurement it is desired that the dimensional measurement has a long term stability within 0.05 millimeters. The measurement instrument of the subject invention is readily adapted for dimensional measurement over the indicated range with an accuracy of 0.01 millimeter and therefore readout or display may be presented with three significant digits.

It will be apparent, as the description proceeds, that the dimension measuring apparatus of the subject invention while especially adapted for use as a hardness checker in a Brinell testing machine is also capable of general application as a noncontacting dimension measuring instrument for surface features of a workpiece.

Referring now to FIG. 1, the illustrative embodiment comprises a hardness testing machine including a fixed support member 10 upon which is mounted a depending hydraulic actuator 12 which supports the indentor 14. For the purpose of positioning the workpiece relative to the indentor, locating means 16 in the form of a tubular enclosure extends from a fixed portion of the actuator to a point beyond the indentor 14 in its retracted position. The locating means 16 defines an opening at its outer end to permit engagement of the indentor 14 with the workpiece 18 which is supported upon a movable table 20. The indentor 14 includes a spherical indenting element 22 at the end thereof and adapted to be pressed against the workpiece 18 with a predetermined load when the indentor 14 is extended under the control of the actuator 12. The apparatus just described is known, per se, and constitutes one embodiment of a conventional Brinell hardness testing machine. In operation of the hardness testing machine the workpiece 18 is supported on the movable table 20 and the table is elevated to a position in which the upper surface of the workpiece is seated against the lower end of the locating means 16. The indentor 14 is then extended under the control of the actuator 12 to press the indenting element 22 against the surface of the workpiece 18 under a predetermined load. This produces an impression 24 in the surface of the workpiece and the indentor 14 is retracted to the position shown. The impression 24 will be of circular cross-section and will have a diameter at the surface plane of the workpiece which is indicative of the hardness of the workpiece.

In order to measure the diameter of the impression 24 a scanner head 30 is mounted adjacent the indentor 14 by a depending bracket 32 connected with the support member 10. In general the scanner head 30 is adapted to produce an optical beam 34 which is projected through a slit 36 onto the surface of the workpiece. The scanner head 30 is adapted to produce a scan motion of the beam 34 which is preferably in a plane perpendicular to the surface of the workpiece (i.e., in the plane of the paper as shown in FIG. 1) and the scanner head is positioned so that the path of the beam on the surface of the workpiece crosses the impression 24 on a diametral line thereof. The locating means 16 is also provided with a slit 38 adapted to transmit the reflected beam 40 from the surface of the workpiece to a photodetector means 42. The photodetector means is mounted on the locating means 16 by a bracket 44 and includes a broad area video detector or photocell 46 adapted to respond to the reflected beam 40 impinging thereon.

Considering now the optical characteristics of the surface of the workpiece; it is noted that the operation of the apparatus depends upon reflection of at least part of the scanning beam 34 from the workpiece surface onto the photocell 46. The scanning beam 34 referred to herein as an optical beam may be in either the visible or nonvisible portion of the spectrum and, as will be described subsequently, is preferably derived from a laser, suitably a helium-neon laser with a wavelength of 6,328 angstrom units. The surface of the workpiece 18, being constituted of metal, is optically reflective to at least some degree. As will appear subsequently, the photodetector means 42 will respond to that portion of the beam which is reflected from the surface at an angle within a given range of reflectance angles. Whether any significant amount of optical energy from the beam is reflected at an angle within said given range of said reflectance angles will depend upon surface characteristics or features of the workpiece. As used herein, the term "surface reflectance discontinuity" refers to a surface feature which for any reason does not reflect a significant amount of optical energy within the given range of relfectance angles. Such a surface relfectance discontinuity may take the form of an indentation in the surface, such as the impression 24, which tends to scatter the reflected energy in other directions; or it may be in the form of a surface coating which absorbs impinging energy or a roughened surface which produces scattering of the light in all directions. It will be appreciated that the arrangement of the scanner head 30 and the photodetector means 42 is such that the photodetector means will sense a significant amount of energy from the scanning beam by reason of reflection thereof from the surface of the workpiece unless the scanning beam is impinging upon a surface reflectance discontinuity.

Figure 2:
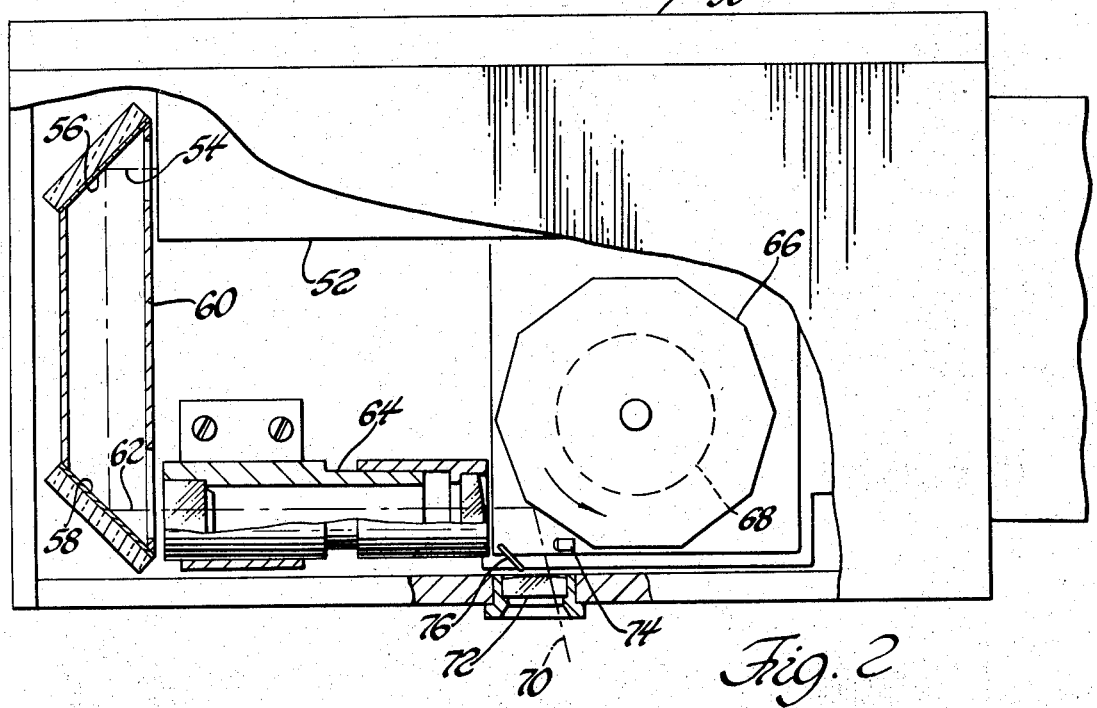
FIG. 2 is a cut-away view partially in section showing the scanner.

Referring now to FIG. 2, the scanner head is shown in greater detail. The scanner head 30 is shown in FIG. 2 as a cut-away partially sectioned view taken on lines 2—2 of FIG. 1. The scanner head comprises a casing 50 within which is mounted a source of optical energy in the form of a helium-neon laser 52 having an output beam directed along an optical axis 54. A folded optical arrangement is utilized which includes a front surface mirror 56 and a front surface mirror 58. The mirrors are mounted on a support tube 60 and are disposed at a right angle so that the laser beam is reversed in direction along an optical axis 62. In order that the beam may be suitably focussed it is transmitted through a beam expander 64 which produces an enlarged collimated beam. The beam is caused to execute a scanning motion by means of a rotatable multi-facetted mirror 66. The mirror 66 is rotatably driven by an electric motor 68 which is preferably a hysteresis synchronous motor so that the mirror speed is held substantially constant over a long term. The beam impinges on the successive facets of the rotating mirror 66 and due to the continuously changing angle of incidence on each facet the optical axis 70 of the reflected beam is caused to sweep through a limited angle and thus performs a scanning motion. A focussing lens 72 is disposed in the wall of the casing 50 and the reflected beam is focussed to produce the desired beam diameter for the required depth of focus. In the illustrative embodiment the beam diameter at the surface of the workpiece is approximately 0.025 millimeters and provides the desired degree of resolution.

For purposes which will be described subsequently a start of scan photodetector is mounted within the casing 50 and a small mirror 76 is disposed adjacent the rotating mirror 66 to reflect a portion of the scanning beam onto the photodetector 74 as the scanning beam passes a predetermined position in each of its successive sweeps. Thus the photodetector 74 is adapted to produce an electrical pulse which coincides in time with a predetermined angular position of the scanning beam.

Figure 3:
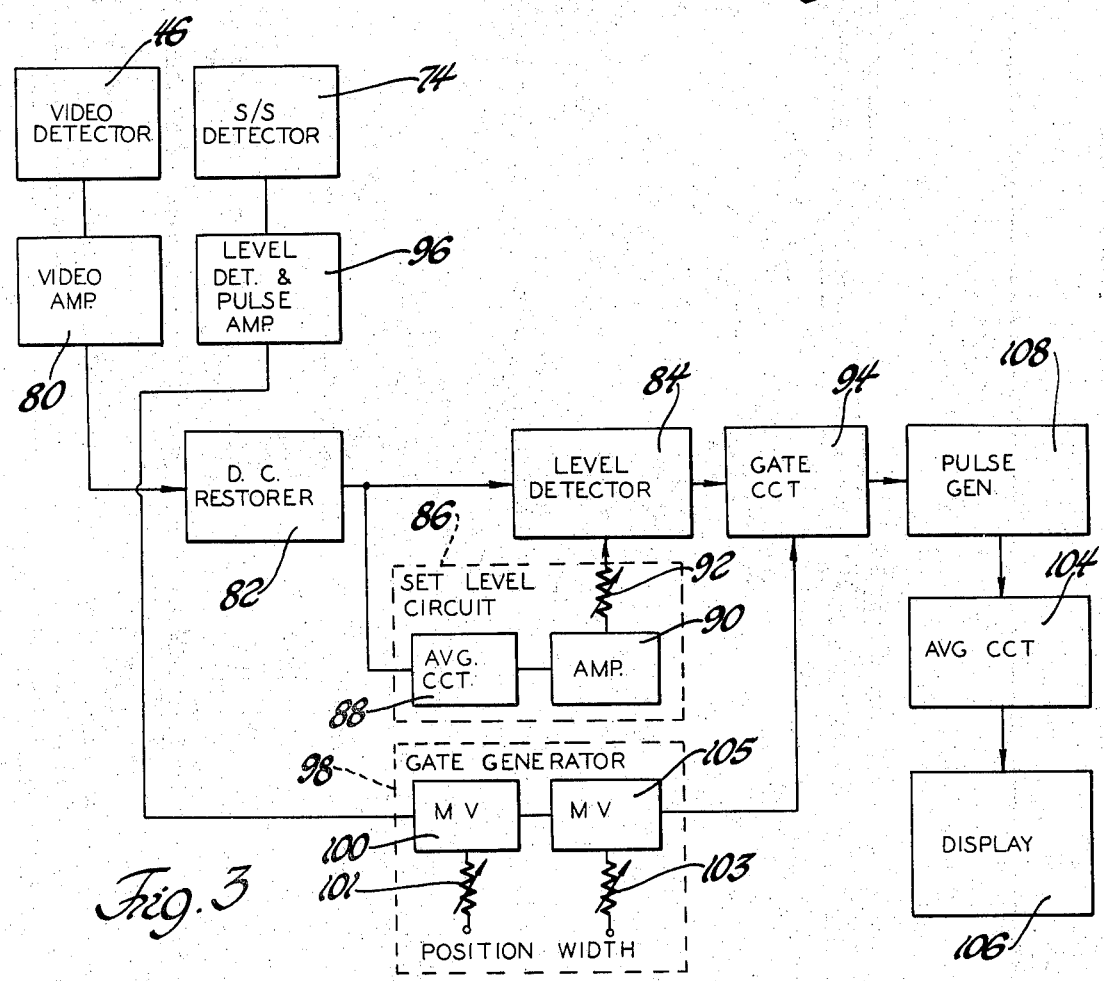
FIG. 3 is a block diagram of the electronic circuits of the subject invention.

Referring now to FIG. 3, there is shown a block diagram of the electronic circuitry of the inventive measuring system. The photocell or video detector 46 produces an electrical pulse upon change of intensity of the incident optical energy. The video detector is suitably a semiconductor type photocell operated in a photoconductive mode. If desired, the input optical energy to the detector may be filtered to attenuate the wavelengths over than that of the source, or alternatively it may be suitably shielded to exclude unwanted radiation. The output of the video detector is applied to an amplifier 80 and thence to a DC restorer circuit 82 which restores a desired value of DC component to the signal. The output of the restorer circuit may be regarded as the video signal and is applied to the input of a level detector 84. The level detector functions in a well known manner to reject an input signal below a given threshold value and to pass an input signal exceeding the threshold value. In order to establish the desired threshold value, a set level circuit 86 is connected with the output of the restorer circuit 82 and supplies a level control signal to the control input of the level detector 84. The set level circuit is automatic in operation to establish the threshold value at a given percentage of the peak intensity level of the video signal. For this purpose the video signal is applied to an averaging circuit which produces an output corresponding to the time average value of the video signal. The time average signal from the circuit 88 is applied through an amplifier 90 and an adjustable attenuator 92 to the control input of the detector 84.

In order to eliminate unwanted video pulses from the desired video signal, a gate circuit 94 is provided for controlling the transmission of the video signal. Accordingly the video signal transmitted by the level detector 84 is applied to one input of the gate circuit 94. A gate pulse is generated at the required time and for the required duration to open the gate circuit 94 just long enough to allow the desired video pulse to pass. For this purpose the start of scan photodetector 74 produces a start of scan pulse at the same corresponding point in each successive sweep of the scanning beam. The start of scan pulse is applied through a level detector and pulse amplifier 96, which amplifies the desired pulse only and applies it to a gate generator 98. The gate generator includes a first single shot multivibrator which is provided with an adjustable time delay element 101. The multivibrator 100 produces an output pulse having a leading edge which is delayed in time a desired amount after the leading edge of the start of scan pulse. The output of the single shot multivibrator 100 is applied to the input of a single shot multivibrator 105 which is provided with a pulse width adjusting element 103. The multivibrator 105 produces a gate pulse of desired width and in desired time relation with the start of scan pulse. This gate pulse from the gate generator is applied to the other input of the gate circuit 94. The output of the gate circuit which occurs upon coincidence of the video signal output from the level detector 84 and the gate pulse, as described more fully below, is applied to the input of a constant current pulse generator 108. The pulse generator produces an output pulse with constant amplitude and of a duration equal to that of the video signal and which is applied to the input of an averaging circuit 104. The averaging circuit functions to produce a DC voltage having a magnitude corresponding to the time average value of the constant current pulses from the generator 108. This DC signal from the averaging circuit 104 thus has a magnitude which is proportional to the time duration of the desired video pulse. Since the time duration of the video pulse is proportional to the dimension of the surface feature being measured, as will be described more fully below, the DC voltage developed by the averaging circuit 104 is proportional to the dimension being measured. The output of the averaging circuit 104 is applied to a display device 106 suitably in the form of a digital volt member which indicates in digital form a number or value proportional to the dimension being measured or, if suitably calibrated, a number equal to the dimension being measured.

The apparatus thus far described is operative for the measurement of a dimension of a surface reflectance discontinuity which, as previously stated, does not reflect a significant amount of optical energy within the effective range of reflectance angles. It is capable of measuring the dimension of a single discrete reflectance discontinuity in the scan path of the optical beam. It is therefore quite effective for use in hardness measurements provided that the impression formed by the indentor constitutes a single surface reflectance discontinuity in the path of the beam. This will be the case if no significant amount of optical energy is reflected within the effective range of reflectance angles from the surface of the impression. In hardness testing of metals with a spherical indentor it is found that the impression is formed with a reflective surface and unless special precautions are taken a significant amount of reflection from the bottom of the impression will be produced within the effective range of reflectance angles. This invention provides measurement circuitry for measuring the diameter of such an impression in spite of the unwanted reflection and the additional circuitry for this purpose will be described subsequently. At this point the operation of the inventive apparatus as shown in FIGS. 1 through 4 will be described for hardness measurement of a workpiece in which the impression of the indentor constitutes a single reflectance discontinuity. This can be provided in any workpiece, such as a metal specimen for hardness testing by blackening the surface of the impression with a suitable ink.

When a hardness measurement is to be made the workpiece 18 is seated against the locating means 16 and the indentor 14 is actuated to produce the impression 24 in the surface of the workpiece and then is retracted to the position shown. The measurement of the diameter of the impression is then effected by optically scanning the surface of the workpiece in a beam path which crosses the impression 24 near a diametral line thereof and processing the resulting video signal. It will be understood from the description of FIG. 2 that the scanner is operative to produce successive sweeps of the scanning beam across the surface of the workpiece including the impression therein at a very high and substantially constant sweep speed. It will also be understood that a single sweep produces a video signal which contains all of the information necessary for further signal processing to produce an indication of the value of the diameter of the impression. The effect of successive sweeps is essentially that of producing a video signal comprising a train of repetitive pulses and a start of scan signal comprising a train of repetitive pulses.

Figure 4:
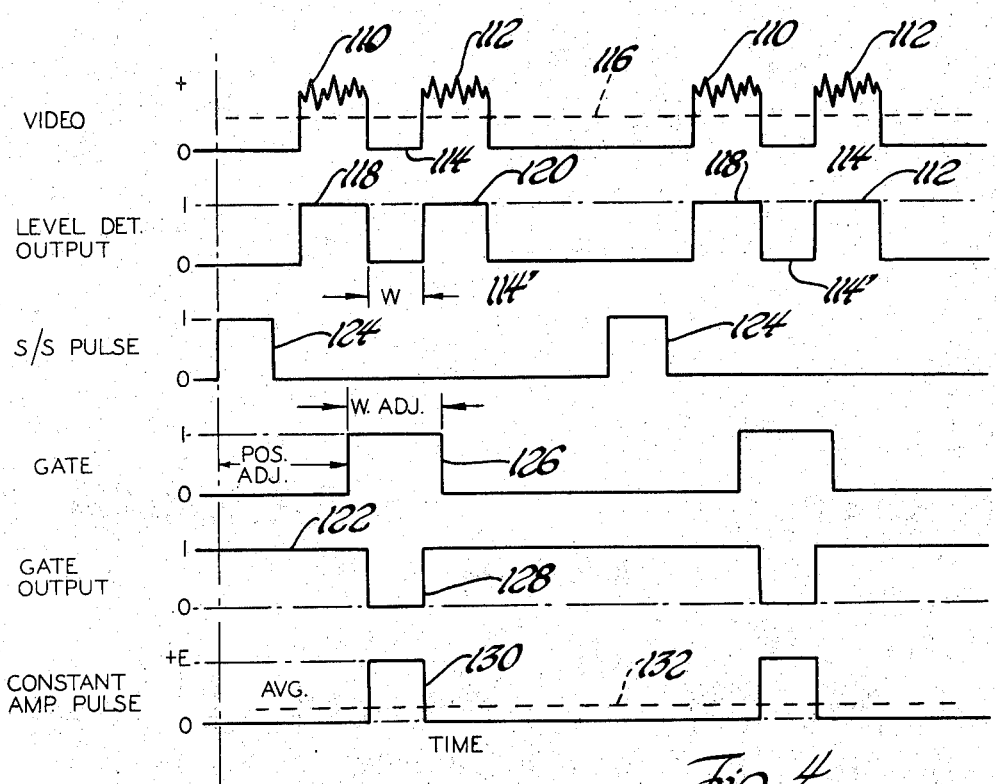
FIG. 4 is a waveform diagram showing the time relation of certain signals in the electronic circuit of FIG. 5.

With the laser 52 and the scanning mirror 66 in operation the scanning beam 34 will enter the slot 36 and impinge on the surface of the workpiece on one side of the impression 24 and the scan motion will produce a trace or path on the surface of the workpiece which crosses the impression and continues to the other side thereof. During this scanning motion a portion of the incident beam on the surface at one side of the impression will be reflected through the slit 38 to the photocell or video detector 46. After the start of scan for a given sweep and before the beam impinges on the workpiece there will be no optical energy reflected onto the video detector 46 and the video signal of FIG. 4 will have a zero value corresponding to the dark condition. When the beam does impinge on the workpiece at an angle of incidence which is equal to a reflectance angle which will cause impingement on the video detector, a video signal of positive value is produced and will vary in amplitude with the intensity variation of the reflection from the workpiece surface. The positive video signal corresponding to a given intensity level will continue during he scan so long as the impinging beam is reflected from the surface at an angle within that range of reflectance angles which will cause the reflected beam to impinge upon the video detector. When, however, the incident scanning beam 34 impinges on the edge of the impression 24 or any other surface reflectance discontinuity no significant portion of the incident beam will be reflected at an angle within said range and the video detector 46 will be in a dark condition and the video signal will drop to the zero level. The video signal as shown in FIG. 4 remains at the zero level for the duration of the crossing of the impression 24 and when the beam reaches the workpiece surface on the other side the video signal will again be reflected onto the video detector and a positive signal corresponding to the intensity level will be produced. When the beam scan reaches the point where the angle of incidence is no longer equal to an angle within the range of reflectance angles the video detector 46 will be in the dark condition and the video signal will return to the zero level. This will complete one sweep of the repetitive scanning motion and one cycle of the video signal and the cycle will be repeated for each sweep of the repetitive scan. Referring to the video signal in FIG. 4, it is noted that the signal comprises a pair of positive video pulses 110 and 112 separated by a "dark" interval 114 corresponding to the crossing of the impression 24 by the scanning beam. In the succeeding cycle, substantially identical positive video pulses 110 and 112 and the "dark" interval 114 are produced and thus the successive sweeps of the repetitive scan produce a pulse train. It is to be noted that the video signal depicted in FIG. 4 corresponds to the signal output of the video detector 46 modified by the video amplifier 80 and the DC restorer circuit 82.

In order to provide a measurement of the diameter of the impression 24 unaffected by spurious video signal components, the video signal is processed further through the level detector 84 and the gate circuit 94. The level detector 84 ensures that there will be no response to video signals which fall below a given threshold value. Such spurious signals might be generated by some relatively low level reflection from the bottom of the impression which reaches the video detector. (If in a given application high intensity reflection is obtained from the bottom of the impression, the impression can be blackened with a suitable ink). The threshold value of the level detector 84 is established by the set level circuit 86 so that only those video signals exceeding the threshold value will be passed by the detector. In order to ensure that the circuit will discriminate between the desired and undesired video pulses the threshold value is caused to assume a variable value of voltage depending upon the average value of the video signals. This enables the circuit to respond to the desired video pulse, even though it may be of high intensity for one workpiece and of relatively low intensity for another due to a reduction in the optical energy reflected from the surface of the workpiece which may result from difference in surface finish or the like. For this purpose the video signal is applied to the averaging circuit 88 and the output thereof corresponding to the time average value of the video signal is applied through the amplifier 90 and attenuator 92 to the level control input of the detector 84. Thus the threshold level or value of the detector 84 is set as a percentage of the peak value of the video signal and is not an absolute value of voltage. Accordingly, if the attenuator 92 is adjusted so that the threshold value is 50 percent of the peak value of the video, such a threshold value will be maintained as a percentage of the peak value regardless of the changes in amplitude of the video signal. The output of the set level circuit 86 is depicted as the DC voltage 116 in FIG. 4. When the video signal as applied to the level detector 84 does exceed the threshold value, the level detector 84 produces output pulses 118 and 120 of positive square-wave corresponding in width to the input pulses 110 and 112. These level detector output pulses are separated by a dark interval 114' having a width which is proportional to the diameter of the impression 24. The level detector output pulses are applied to one input of the gate circuit 94 but the gate output signal 122 is maintained at a high or positive value during a dark interval at the gate 94 unless a high or positive gate signal is applied coincidentally to the other input of the gate circuit 94. The gate generator 98 is operative to apply such a gate signal to the circuit 94 in coincidence with the desired video pulse. The start of scan detector 74 generates a scan pulse 124, as shown in FIG. 4, which occurs at some arbitrary value of time in the scanning motion of each sweep. The start of scan pulse is applied through a level detector, which suitably has a threshold value of fixed voltage, and combined pulse amplifier to the single shot multivibrator 100. The time delay of the multivibrator is adjusted by the element 101 so that the leading edge occurs in time just prior to the leading edge of the dark interval 114'. The single shot multivibrator 105 is adjusted for pulse width by the element 103 so that the trailing edge occurs just immediately after the trailing edge of the dark interval 114'. Accordingly, the gate pulse 126 depicted in FIG. 4 and produced by the multivibrator 105 just overlaps the dark interval 114' and is applied to the other input of the gate circuit 94.

The output of the gate circuit 94 is a negative going pulse 128 which is of precisely the same width as the dark interval 114'. The gate output pulse 128 is applied to the input of the constant amplitude pulse generator 108 which produces an output pulse 130 of constant amplitude value E and of a width equal to the width of the gate output pulse 128. The averaging circuit 104 produces a DC voltage 132 equal to a time average value of the constant amplitude pulses over all of the repetitive sweeps during the measurement interval. It will be appreciated that the value of the DC voltage 132 will remain the same through succeeding sweeps, even though the sweep frequency does not remain constant during successive sweeps because a change of sweep frequency affects the pulse duration and sweep duration proportionately and the average value of the pulse does not change. The DC voltage 132 has a value which is proportional to the time duration of the dark interval 114 in the video signal and the value thereof is indicated by the display device 106. By suitable calibration, the value indicated by the display device will be equal to the diameter of the impression 24 in the workpiece expressed in millimeters and will be indicative of the hardness thereof.

As discussed above, the impression formed by a spherical indentor for hardness testing has a reflective surface and a significant amount of optical energy is reflected from the bottom of the impression. In effect, such an impression results in two dark intervals during the scan of the beam across the diameter of the impression.

Referring now to FIG. 6a, the scan path of the optical beam is depicted on the surface of the workpiece 18' which includes an impression 24' formed by an indentor element for hardness testing. The scan path 140 traverses the diameter of the impression and it is desired to measure the diameter as an indication of hardness of the workpiece. The impression 24' is formed with a reflective surface and consequently a significant amount of optical energy will be reflected from the bottom of the impression within the effective range of reflectance angles. This occurs because the bottom of the impression has a surface area which has only a small degree of angularity relative to the normal surface of the workpiece. On the other hand, the edges or rim area of the impression have a high degree of angularity relative to the surface of the workpiece and consequently no significant optical energy is reflected therefrom within the effective range of reflectance angles.

This condition is exhibited in the video signal as depicted in the waveform diagram of FIG. 6b. Note that the video signal comprises a pair of positive video pulses 142 and 142' separated by a high amplitude somewhat triangular shaped pulse 144 which is produced by the reflection of the beam from the bottom of the impression. The pulse 142 which results from the normal surface reflection as the scan path approaches the impression decreases abruptly at the edge of the impression and is separated from the leading edge of the pulse 144 by a dark interval corresponding to the steep side or rim portion of the impression. Similarly, the leading edge of the pulse 142' rises steeply at the other edge of the impression 24' and is separated from the trailing edge of the pulse 144 by a dark interval corresponding to the rim portion of the impression. As shown in FIG. 3 the video signal is applied from the video detector 46 through the video amplifier 80 and the DC restorer 82 to the input of the level detector 84. The level detector is effective to convert the video signal into a digital pulse signal. This is depicted in FIG. 6 b as the detector output wherein that portion of the video signal above a given threshold value produces a digital "1" output and that portion of the video signal below the threshold produces a digital "0" output. Consequently the waveform of the detector output comprises three successive pulses with the trailing edge 146 of the first pulse and the leading edge 148 of the third pulse being spaced by a time interval which corresponds to the diameter of the impression 24'. As described previously with reference to FIG. 3, the gate generator 98 produces a gate pulse 150 which overlaps the leading and trailing edges 146 and 148 of the first and third pulses of the detector output. Consequently the gate circuit 94 produces an output as shown in FIG. 6b which comprises a first pulse 152 from the start of scan to the edge of the impression followed by a second pulse 154 which corresponds to the bottom of the impression and followed by a third pulse 156 which extends from the edge of the impression to the end of scan. It can be seen that this gate output contains the necessary information for determining the diameter of the impression, but the desired dimension will not be indicated by the apparatus of FIG. 3 alone, since the pulse generator 108 would produce two constant amplitude pulses corresponding to the dark intervals between the pulses 152, 154 and 156. The average value of the two constant amplitude pulses would not be indicative of the diameter of the impression because of the second pulse 154 produced by the bottom of the impression.

Figure 5:
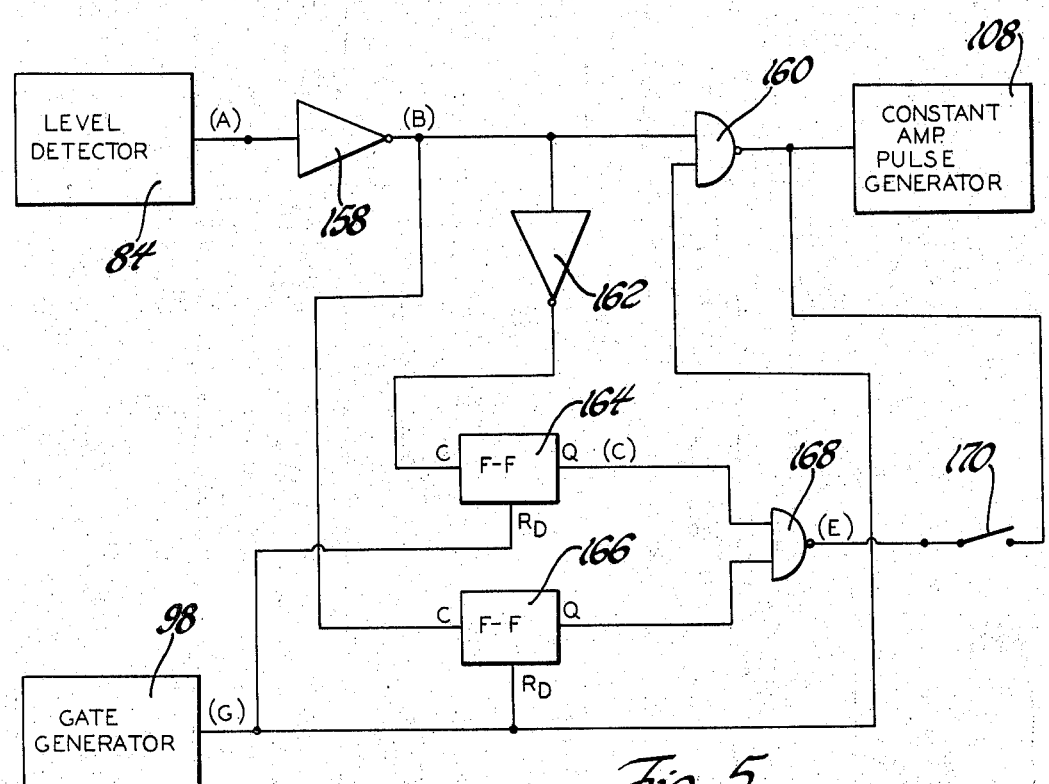
FIG. 5 is a diagrammatic representation of a digital logic circuit.

Accordingly, special signal processing is provided by the logic circuitry of FIG. 5 to derive the desired dimensional information. The logic circuitry is connected to the apparatus of FIG. 3, as indicated in FIG. 5 wherein the level detector 84, the gate generator 98, and the pulse generator 108 are the same as those shown in FIG. 3. It is noted that the level detector 84 is followed by an inverter 158 and the AND gate 94 of FIG. 3 is replaced by a NAND gate 160. The output of the inverter 158 is applied to one input of the gate 160 and is also applied through an inverter 162 to the clock input of a first flip-flop 164 and it is applied directly to the clock input of a second flip-flop 166. The flip-flops 164 and 166 both have their Q outputs connected respectively to the inputs of a NAND gate 168. The output of the NAND gate 168 is applied through a manual switch 170 to the input of the pulse generator 108. The output of the gate generator 98 is connected to the respective direct reset inputs of the flip-flops 164 and 166 as well as being connected to the other input of the NAND gate 160.

It is apparent from inspection of FIG. 5 that manual switch 170 is effective when open to disable the output of the logic circuitry. With the switch 170 open the logic circuit has no effect on the measurement circuit as shown in FIG. 3 and the operation of the measurement circuit is exactly as described with reference to FIG. 3.

When it is desired to make a hardness measurement with a workpiece having a significantly reflective impression formed by the indenting element, it will be necessary to use the logic circuit to effectively blank out the reflection from the bottom of the impression. Accordingly, switch 170 is closed so that the output of the logic circuit is connected to the input of the pulse generator 108.

The operation of the inventive measuring system with the electronic circuitry of FIG. 3, including the logic circuitry of FIG. 5, will now be described with reference to FIG. 7. The operation in respect to producing the impression in the workpiece and the scanning thereof by the optical beam is the same as previously described and will not be repeated here.

The level detector output (A), as shown in waveform A of FIG. 7, is the same as that detector output described with reference to FIG. 6b. It includes a first digital "1" pulse 172 corresponding to the beam reflection from the normal surface of the workpiece, a second digital "1" pulse 174 corresponding to the beam reflection from the bottom of the impression and the third digital "1" pulse 176 corresponding to the beam reflection from the normal workpiece surface on the far side of the impression. Between the pulses 172 and 174 the output of the detector is at digital "0" corresponding to the "dark" interval just beyond the leading edge of the impression and between the pulses 174 and 176 the detector output is at digital "0" corresponding to the dark interval just prior to the trailing edge of the impression. The detector signal (A) is applied to the inverter 158 and the output (B) of the inverter has a waveform B as shown in FIG. 7. This waveform includes digital "1" pulses 178 and 180 which correspond respectively with the dark intervals referred to in connection with waveform A. It is noted that the time interval W between the leading edge of pulse 178 and the trailing edge of pulse 180 corresponds to and is directly proportional to the diameter of the impression. The output of the inverter 158 is applied to the input of the inverter 162 and the output thereof is the same as the waveform A. The gate generator 98 as described previously, produces a gate signal (G) as depicted by waveform G of FIG. 7. Note that the gate signal is of time duration so that it spans and overlaps the interval from the leading edge of pulse 178 to the trailing edge of pulse 180. The gate signal is applied to the reset inputs of the flip-flops 164 and 166 and is effective to hold the Q outputs thereof at "0" until a negative going input is applied to the clock input of the flip-flops. Consequently, flip-flop 164 produces output (C) with a pulse 182, as depicted by waveform C of FIG. 7. Note that the output (C) is at "0" until the output of inverter 162 goes negative as shown in waveform A which coincides with the leading edge of pulse 178 of waveform B. Flip-flop 164 remains in the state with the Q output at "1" until the clock input goes negative again at which time it changes state. Thus, as shown in waveform C, the Q output goes to "0" when the pulse 174 of waveform A goes negative. The Q output of flip-flop 166 produces output D with a pulse 186 held at "0" until the clock input thereof from inverter 158 goes negative which occurs at the trailing edge of pulse 178 of waveform B. The flip-flop output remains in the "1" state until the clock input again goes negative, which occurs at the leading edge of pulse 180 of waveform B. The outputs of flip-flops 164 and 166 are applied to respective inputs of the NAND gate 168. The NAND gate operates to produce an output (E), as shown by the waveform E of FIG. 7. The output (E) is at digital "1" until both outputs (C) and (D) of flip-flops 164 and 166 are at digital "1" and when either of the inputs go to digital "0," the output of gate 168 goes to digital "0." This occurs at the leading edge of pulse 182 of the waveform D. The output of the NAND gate 168 will remain at digital "0" until either of the inputs goes to digital "0" which occurs at the trailing edge of pulse 184 of waveform C. Consequently, it is noted that the pulse 186 of waveform E coincides in time with the pulse 174 of waveform A which corresponds to the occurrence of beam reflection from the bottom of the impression.

The output (E) comprising the pulse 186 of waveform E, FIG. 7 and developed by the NAND gate 168 is applied through the switch 170 to the input of the pulse generator 108. As previously described, the output of the NAND gate 160 is also applied to the input of the pulse generator 108. The output of the NAND gate 160 with the switch 170 open is the same as described with reference to FIG. 6b and is depicted as waveform F in FIG. 7. As mentioned, the outputs of the two NAND gates 160 and 168 are connected together at the input of the pulse generator 108. This connection effectively combines them in the manner of an "OR" logic element so that the input to the pulse generator 108 is equivalent to the output of an "OR" circuit with inputs corresponding to waveforms E and F. The resultant input signal to the pulse generator 108 is depicted as waveform H in FIG. 7. Thus the waveform H is at digital "1" so long as both waveform E and waveform F are at digital "1." When either of the waveforms E or F go to digital "0" (which occurs at the leading edge of pulse 178 of waveform B), the waveform H goes to digital "0" and it will remain there so long as either of the waveforms E or F are at digital "0." Note that waveform E goes to digital "0" at the same time that waveform F goes to digital "1" and therefore the waveform H is effectively held at digital "0," although there may be a transient too fast to detect. Similarly waveform E returns to digital "1" at the same time that waveform F returns to digital "0" and the waveform F is effectively held at digital "0." It remains at digital "0" until waveform F returns to digital "1", at which time waveform H returns to digital "1". Thus the combined output of the NAND gates 160 and 168 and hence the input of pulse generator 108 is a pulse 188, as shown in waveform H. The pulse 188 has a leading edge which coincides with the leading edge of pulse 178 of waveform B and the pulse 188 has a trailing edge which coincides with the trailing edge of pulse 180 of waveform B. Thus the width or duration of pulse 188 is W and corresponds to the diameter of the impression.

The pulse 188 applied to the input of the pulse generator 108 results in a constant amplitude pulse having a duration proportional to the diameter of the impression in the workpiece. The averaging circuit 104 and the display device 106 operate in a manner previously described and the value indicated by the display device will be equal to the diameter of the impression 24 in the workpiece and will be indicative of the hardness thereof.

It will now be appreciated that the subject measuring apparatus is capable of providing dimension measurements with a very high degree of uniformity and repeatability over a long term of operation. The output measurement signal is substantially unaffected by variations in video signal amplitude, spurious discontinuities in the workpiece surface, and variations in sweep frequency. A very high degree of accuracy is achieved by use of a focussed spot which yields sharply defined pulses to delineate the surface feature being measured.

Although the description of this invention has been given with reference to a particular embodiment, it is not to be construed in a limiting sense. Many variations and modifications will now occur to those skilled in the art. For a definition of the invention reference is made to the appended claims.

The embodiments of the present invention in which an exclusive property or privilege is claimed are defined as follows:

1. Apparatus for measuring a dimension of a surface reflectance discontinuity of a workpiece comprising; scanner means for causing an optical beam to scan a predetermined path on the surface of said workpiece, photodetector means operatively disposed in the plane of scan of said beam and in a position relative to the scanner means to respond to that portion of the beam which is reflected from said surface at an angle which is within a given range of reflectance angles, said photodetector means producing an electrical signal which varies with the intensity of energy reflected within said range, electronic means connected with the photodetector means for producing an output signal having a magnitude proportional to the time duration that said electrical signal has a value which is below a threshold level indicative of reflection of said beam, and means for indicating the magnitude of said output signal as a measurement of the length of said discontinuity along said path.

2. The invention as defined in claim 1 wherein said scanner means comprises; a source of optical energy, optical means operatively related with the source for developing an optical beam, and a rotatable mirror in the path of said beam.

3. The invention as defined in claim 1 wherein said electronic means includes means for selecting from said electrical signal a single electrical pulse corresponding to a selected discontinuity and includes averaging means for averaging the value of said pulse over the time period of the scan of said path.

4. The invention as defined in claim 1 wherein said scanner means includes means for causing the beam to scan the same path repeatedly in the same direction of scan whereby said photodetector means produces a train of electrical pulses.

5. The invention as defined in claim 3 including a second photodetector means, said second photodetector means being disposed in the path of said beam produced by said scanner means adjacent the starting position of the scan and adapted to produce a start of scan pulse for each scan of the path, a gate pulse generator connected with second photodetector means and adapted to produce a gate pulse in overlapping time relation with the electrical pulse from the first mentioned photodetector means, said electronic means including a gate circuit having one input connected with said level detector and the other input connected with said gate generator and the output being connected with said indicating means.

6. The invention as defined in claim 5 wherein said electronic means includes a constant amplitude pulse generator connected between said gate circuit and said indicating means and being adapted to produce a constant amplitude pulse having a duration proportional to said electrical pulse from the first mentioned photodetector in response to the occurrence of said electrical pulse.

7. The invention as defined in claim 6 wherein said electronic means includes a level detector circuit connected between said second photodetector means and said gate generator and adapted to respond only to a pulse exceeding the predetermined amplitude corresponding to the pulse amplitude produced by the first mentioned photodetector means in response to the selected discontinuity.

8. The invention as defined in claim 7 wherein said electronic means includes a set level circuit connected between the first mentioned photodetector means and a reference input on said level detecting means, said set level circuit comprising an averaging circuit and adjustable amplifying means whereby the threshold value of said level detector is automatically adjusted in accordance with variations in the peak value of said electrical pulse from the first mentioned photodetector means.

9. The invention as defined in claim 8 wherein said source of optical energy is a laser, and said optical means includes a beam expander and a focussing lens for developing a focussed beam impinging upon said scanner means.

10. In a hardness testing machine, apparatus for measuring the diameter of an impression in the surface of a workpiece, said apparatus including a support member, an indenting element and actuating means therefor mounted on the support member, said indenting element being adapted to engage a workpiece and form an impression therein, an optical scanner mounted on said support member and including a source of optical energy, beam forming means operatively related to said source for developing an optical beam, scanner means in the path of said beam for causing said beam to traverse a scan path which intercepts the position occupied by the indenting element when actuated to form an impression in said workpiece, whereby the scan path crosses said impression near a diametral line thereof, the motion of said beam being at a substantially constant speed, photodetector means mounted on said support member and disposed relative to the scanner to respond to that portion of the beam which is reflected from said surface at an angle within a given range of reflectance angles in the plane of beam motion, said photodetector means producing an electrical pulse when there is a change of intensity of optical energy reflected within said range, whereby an impression formed by said indenting element will produce a pulse having a time duration corresponding to the diameter of said impression, and electronic means connected with said photodetector means and responsive to the time duration of said electrical pulse.

11. The invention as defined in claim 10 wherein said actuating means is operative to extend and retract said indenting element to form said impression in the workpiece, locating means adapted to be seated against the surface of said workpiece and extending beyond said indenting element in its retracted position whereby the scan path of said beam is unobstructed by said indenting element.

12. The invention as defined in claim 11 wherein said locating means forms an enclosure for said indenting element, said enclosure defining an opening at the outer end for passage of the indenting element to engage the workpiece, said enclosure defining a slit extending in said plane of beam motion for admitting the beam to the surface of the workpiece, said enclosure defining a second slit on the opposite side thereof extending in said plane of beam motion for admitting the portion of the beam reflected from the surface to said photodetector means.

13. The invention as defined in claim 12 including means for selecting a single electrical pulse and including indicating means for displaying a value proportional to the time duration of the selected pulse.

14. The invention as defined in claim 10 wherein said scanner means includes means for causing the beam to scan the same path repeatedly in the same direction of scan whereby said photodetector means produces a train of electrical pulses.

15. The invention as defined in claim 13 wherein said electronic means includes means for indicating the time average value of the pulse over the time period of the scanning motion as an indication of the diameter of the impression.

16. The invention as defined in claim 15 wherein said electronic means comprises level detecting means connected between said photodetector means and said indicating means and adapted to produce an output pulse when said electrical pulse from the photodetector means exceeds a predetermined value.

17. The invention as defined in claim 16 including a second photodetector means, said second photodetector means being disposed in the path of said beam produced by said scanner means adjacent the starting position of the scan and adapted to produce a start of scan pulse for each scan of the path, a gate pulse generator connected with second photodetector means and adapted to produce a gate pulse in overlapping time relation with the electrical pulse from the first mentioned photodetector means, said electronic means including a gate circuit having one input connected with said level detector and the other input connected with said gate generator and the output being connected with said indicating means.

18. The invention as defined in claim 17 wherein said electronic means includes a constant amplitude pulse generator connected between said gate circuit and said indicating means and being adapted to produce a constant amplitude pulse having a duration proportional to said electrical pulse from the first mentioned photodetector in response to the occurrence of said electrical pulse.

19. The invention as defined in claim 18 wherein said electronic means includes a level detector circuit connected between said second photodetector means and said gate generator and adapted to respond only to a pulse exceeding the predetermined amplitude corresponding to the pulse amplitude produced by the first mentioned photodetector means in response to the selected discontinuity.

20. The invention as defined in claim 19 wherein said electronic means includes a set level circuit connected between the first mentioned photodetector means and a reference input on said level detecting means, said set level circuit comprising an averaging circuit and adjustable amplifying means whereby the threshold value of said level detector is automatically adjusted in accordance with variations in the peak value of said electrical pulse from the first mentioned photodetector means.

21. The invention as defined in claim 10 wherein said source of optical energy is a laser, and said optical means includes a beam expander and a focussing lens for developing a focussed beam impinging upon said scanner means.

22. Apparatus for measuring a dimension of an impression in the surface of a workpiece comprising; scanner means for causing an optical beam to scan a predetermined path on the surface of said workpiece, photodetector means disposed in a position relative to the scanner means to respond to that portion of the beam which is reflected from said surface at an angle within a given range of reflectance angles in the plane of the beam motion, said photodetector means producing an electrical signal which varies with the intensity of energy reflected within said range, electronic detector means adapted to respond only to signals above a predetermined threshold value and connected with the photodetector means for producing a pulse having leading and trailing edges corresponding respectively to the excursions of said signal above and below the predetermined threshold value whereby a group of pulses may be produced during the scan of said impression, pulse forming means for producing a single pulse having a duration extending from the leading edge of the first pulse of said group to the trailing edge of the last pulse of said group, and means for indicating a value proportional to the time duration of said single pulse as a measurement of the length of said impression along said path.

23. The invention as defined in claim 22 wherein said pulse forming means comprises digital logic means for producing a pulse having leading and trailing edges upon the occurrence of the first and last excursions respectively of said signal above and below the predetermined threshold value within a given portion of said scan and for holding the pulse amplitude substantially constant between said edges.

24. The invention as defined in claim 23 wherein said digital logic means includes first and second flip-flops for producing first and second pulses respectively with the leading edge of the first pulse coinciding with the first excursion and the trailing edge of the second pulse coinciding with the second excursion, and means including a gate for producing a single pulse having leading and trailing edges coinciding with the aforementioned leading and trailing edges respectively.

25. The invention as defined in claim 23 wherein said means for indicating includes an averaging circuit for producing an electrical signal proportional to the time average value of the single pulse over the time period of the scanning motion as an indication of a dimension of the discontinuity.

* * * * *